June 18, 1935.  C. P. DEBUCH ET AL  2,005,648
PROCESS OF AND APPARATUS FOR THE HEAT TREATMENT
OF SUBSTANCES IN ROTARY TUBE FURNACES
Filed March 9, 1934  3 Sheets-Sheet 1
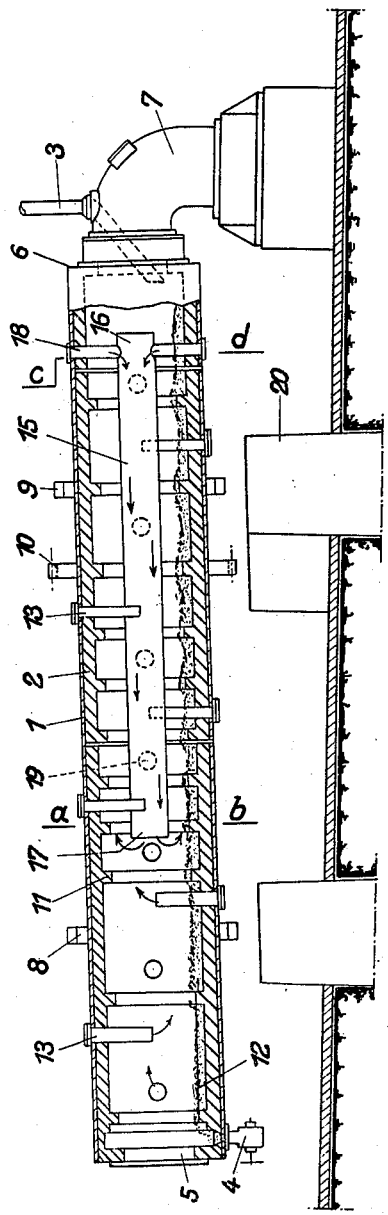
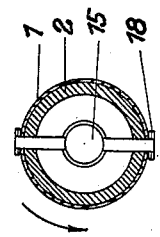
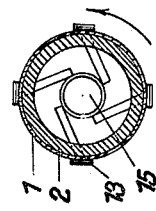
Inventors:
Carl Paul Debuch,
Ernst Markworth,
By Potter, Pierce & Scheffler,
Attorneys.

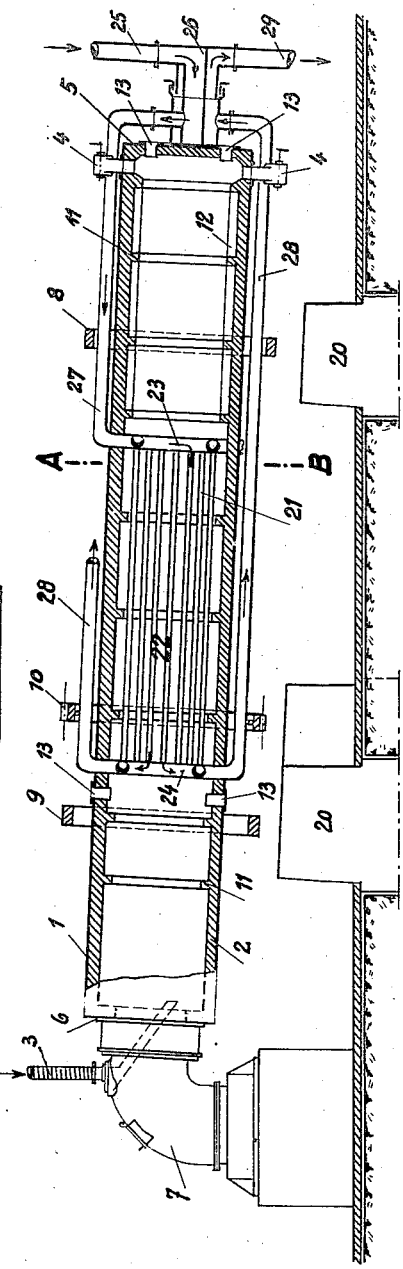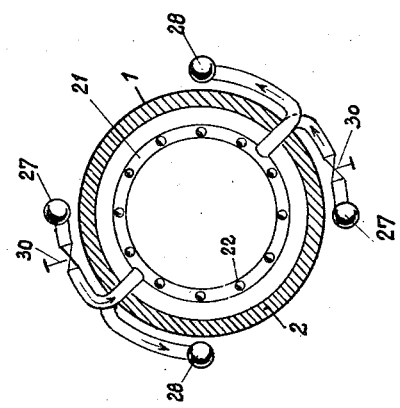

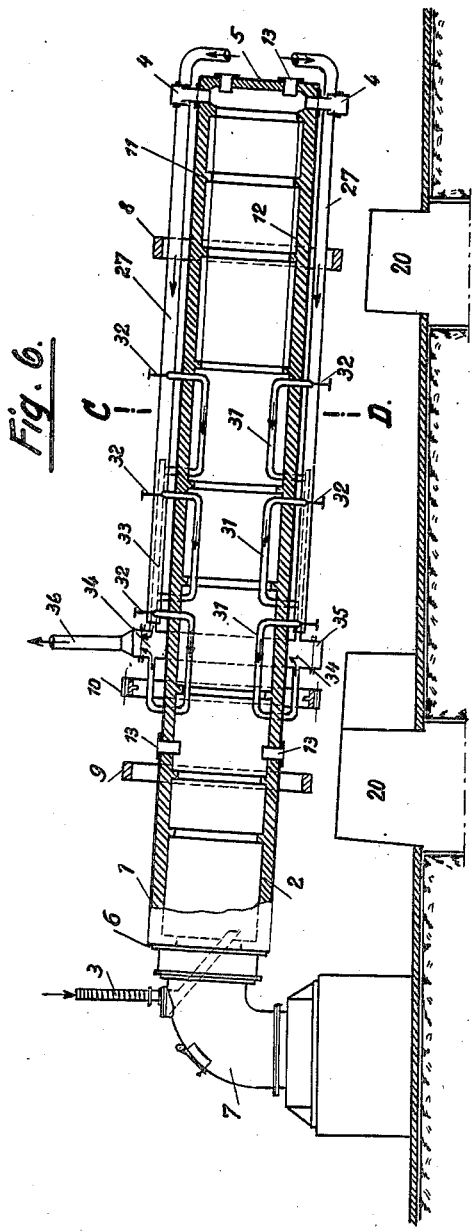

Patented June 18, 1935

2,005,648

UNITED STATES PATENT OFFICE 2,005,648

PROCESS OF AND APPARATUS FOR THE HEAT TREATMENT OF SUBSTANCES IN ROTARY-TUBE FURNACES

Carl Paul Debuch and Ernst Markworth, Frankfort-on-the-Main, Germany, assignors to American Lurgi Corporation, New York, N. Y., a corporation of New York Application March 9, 1934, Serial No. 714,875
In Germany March 27, 1933

16 Claims. (Cl. 263—33)

This invention relates to a process of and apparatus for the heat treatment of substances in rotary-tube furnaces.

In the heat treatment of substances in rotary-tube furnaces, the problem frequently arises of regulating the temperatures in the several portions of the furnace in accordance with the most favorable conditions for carrying out the process concerned.

In the case of processes in which heat has to be supplied externally, the temperature can be regulated by providing a larger number of burners in the shell of the furnace. These burners are distributed over the length and perimeter of the furnace in accordance with the experience gained in practice and they may be operated with solid, liquid or gaseous fuels. When the process is to be carried out in a rotary-tube furnace, and the requisite heat is produced by the chemical reactions occurring in the process itself, the regulation of the temperature can be effected by introducing the substances intended to react together into the furnace by means of nozzles arranged, for example, in accordance with the same consideration as the aforesaid burners. In roasting processes, such as the roasting of zinc blende, the roasting air is therefore subdivided into different currents which are admitted into various zones of the furnace. A similar procedure can be adopted when the material consists of, or contains, combustible substances which are subjected to complete or partial combustion in the rotary-tube furnace.

In many cases, however, such methods of temperature regulation are not completely satisfactory. In some zones of the furnace, flame gases, introduced into the furnace through the burners, have an adverse effect on the intended chemical reactions, and the gas currents in the furnace itself may also be unfavorably influenced. The introduction of air is moreover useless for regulating temperatures at places, for example at the discharge end of the furnace, where the material only contains small amounts of substances which enter into reaction with the air, with the development of heat. In roasting zinc blende for example, the roasting reaction decreases greatly at the discharge end, because there, the roasting charge contains but little sulphur, so that the furnace grows comparatively cold, even when special provision for the supply of air is made at these points. For these reasons, the roasting may be incomplete.

Moreover, allowing the temperatures to rise too high may result in difficulties in the operation of the rotary drum furnace. When roasting pyrites for example, it has been shown that about 5% of the heat developed in the rotary drum furnace leaves the furnace with the dead roasted material, a further 60% of the heat is removed with the roasting gases and the remaining 35% is given off through the furnace walls. Naturally, these values only hold for a furnace of specified dimensions and when roasting a specified material. If it be desired to increase the output of such a furnace, this should be possible without difficulty by charging corresponding quantities of roasting material and roasting air. In such case however, an increased evolution of heat and higher working temperatures would be produced, which is not permissible because the roasting material would commence to sinter or melt. Such phenomena must, as is well-known, be avoided at all costs in a properly conducted working operation. Since the temperature is very often maintained at the uppermost limit when roasting sulphur pyrites, for the purpose of attaining the maximum furnace throughput, such a method of operating the furnace will moreover involve the risk of jeopardizing the operation owing to sintering occurring.

In such cases, it is absolutely necessary in order to safeguard the operation or to increase the furnace throughput that the excessive evolution of heat in the furnace should be rendered harmless.

Proposals made with this end in view are already known. Thus for example, it has been proposed to add dead-roasted material to fresh roasting material and also to return the roasting gases into the furnace. In order to be effective, however, these proposals involved a considerable increase in the velocity of the material or of the roasting gases through the furnace, and therefore having regard to all the drawbacks to be encountered, such as increased evolution of dust, should better be avoided.

According to the present invention it is possible to obviate all these drawbacks during the working of the rotary drum furnace and to equalize the temperatures in the various zones of the rotary drum furnace and to maintain them at a uniform level by introducing through pipes freely exposed in and to the rotary drum furnace atmosphere a heat carrier in the form of a gas or vapour, so that heat exchange takes place through the walls of said pipes between the heat carrier and the gases present in the rotary drum furnace.

In this manner heat can be withdrawn from a portion of the rotary drum furnace which is working at too high a temperature, this heat being taken up by the heat carrier, which is introduced at a lower temperature, and withdrawn from the furnace. Alternatively, a heat carrier heated to a suitable temperature is used, this heat carrier transferring heat through the walls of the pipes to zones of the rotary drum furnace which are working at too low a temperature. The process of the present invention may also be carried out by transferring heat by means of the heat carrier flowing through the pipes from the hottest portion or a plurality of hotter portions of the rotary drum furnace to a colder portion or a plurality of colder portions thereof.

In the simplest case, the pipes for the heat carrier consist of a single tube disposed inside the furnace. It may however, be of advantage for example, for the purpose of obtaining an improved transference of heat between the furnace atmosphere and the heat carrier, to employ a tubular system consisting of a plurality of tubes disposed in parallel. Each of these tubes can be connected by means of special pipes passing through the shell of the furnace with the intake and outlet pipes for the heat carrier, or the ends of the tubes of the system or of a single group of tubes can be connected for example, by annular tubes which then serve for the intake and outlet of the heat carrier.

The points of entry or supply of the gas to the pipes may obviously also be distributed along the entire length and over the periphery of the tubes.

The pipes, for example, the tube or tubular system through which the heat carrier flows, are preferably constructed of a structural material of high heat conductivity which will resist the effects of heat and corrosion, such as non-scaling or stainless steels, chromium nickel alloys, chromium nickel cobalt alloys and alloys containing chromium or nickel or other alloys which are adapted to withstand the conditions as regards the temperature and behaviour of gases that arise at the time. In order to improve the heat transference, the pipes or tubes of the system can be provided externally and/or internally with ribs or similar attachments improving the thermal conductive efficiency. The tubes are secured in the furnace for example, in the manner apparent from the drawing.

In addition to the method described in the present invention, known methods of heating the furnace by nozzles or burners can obviously be retained.

Air can be employed for example as the heat carrier, being supplied under a natural or forced draught or pressure for example, by means of a fan. It is however advantageous in some circumstances, for example in order to reduce the absolute quantity of gases which is to be passed through the pipes, to employ instead of air, gases having a high specific heat such as carbon dioxide, fume or roasting gases. Such gases, inasmuch as they have a certain value, are preferably employed in a cycle, for example, by cooling or heating them after issuing from the pipes outside the furnace and returning them again through the tubular system. Should the heat carrier issue from the furnace in a heated condition, its heat can be utilized in any desired manner outside the furnace. Thus for example, the material to be treated can be wholly or partially dried by means of the heat carrier.

If small quantities only of the heat carrier are necessary, it can in very many cases be passed through the pipes with the natural draught produced for example, by arranging a hood with a draw-off flue over the gas outlet openings in the furnace walls. If however, larger quantities of the heat carrier have to be employed or larger velocities of the gas have to be employed in the tubular system, it is advisable to convey the heat carrier by means of blowers, fans, jet apparatus and the like.

In some processes it is observed that many zones in the rotary drum furnace work with a higher temperature. In such cases, it is obviously possible without any further difficulty to provide a special tubular system for each of these zones. The heat carrier in these circumstances can be supplied to the individual tubular systems from the common main supply conduit. Obviously, however, other methods of supplying the heat carrier are possible and a separate tubular system for a plurality of hot adjacent zones in the same furnace can be provided so that said tubular system extends through all the zones.

It is possible by arranging that the tube or tubular system should be of suitable size and by adjusting the quantity of cooling agent which is to be employed, to withdraw any desired quantity of heat from the furnace.

The invention not only enables the temperatures in the rotary drum furnace to be better regulated, but considerably greater throughputs can be attained, with the same furnace. Moreover, the composition of the gas in the furnace is completely under control, since the heat carrier flowing through the pipes can be conducted away separately from the other gases or can only be allowed to mix with the latter in cases where no disadvantage is to be feared from said mixing.

It is therefore unnecessary for the heat carrier always to be conducted away from the furnace separately from the other gases. It can, on the contrary, be supplied to the furnace through the open end of the tube or tubular system or gain access through the plurality of openings arranged in the tube into the furnace atmosphere. This embodiment of the process of the present invention affords special advantages in the case of a roasting process for example, since it is possible in this manner not only to supply heat to the portions of the furnace which are becoming too cold directly through the agency of the—in this case hot—heat carrier, but also to supply preheated roasting air. In such case the roasting air supplying devices hitherto necessary for this portion of the furnace in the known processes can be thus wholly or partially dispensed with.

The apparatus is with advantage so arranged that the gases flow in counter-current through the tubes to the gases in the furnace themselves, but it is also possible to use them in concurrent flow.

If the method of the present invention is to be carried out in such a manner that the hot gases passed through the pipe withdraw heat from a hot portion of the furnace and return it directly to a portion which is growing too cold, the pipe is passed, for example, centrally through the hot portion of the furnace and through the cold portion that is to be heated. The gases are admitted, through one or more intakes, into that end of the pipe that is situated in the hot portion of the furnace, and flow through the pipe towards the cold portion that is to be heated.

In order more clearly to disclose the invention, reference is made to the accompanying drawings which illustrate diagrammatically and by way of example, several embodiments of apparatus in accordance with the invention.

Referring to said drawings, Fig. 1 shows a longitudinal section through a rotary drum furnace which is so constructed that the hot furnace zones can be cooled and cold furnace zones can be heated by the action of pipes which are exposed to the furnace atmosphere.

Figs. 2 and 3 are sections on the lines a—b and c—d of Fig. 1;

Fig. 4 is an embodiment in longitudinal section of a cooled rotary drum furnace;

Fig. 5 is a section on the line A—B of Fig. 4;

Fig. 6 shows another embodiment of this rotary drum furnace likewise in longitudinal section;

Fig. 7 is a section on the line C—D of Fig. 6.

The rotary-tube furnace, consisting substantially of the metal shell 1 and lining 2, is mounted obliquely. The material is introduced by means of the charging device 3 and leaves through the discharging device 4. The furnace is closed at its lower end 5 and is provided, at its upper end 6, with the gas outlet 7. 8 and 9 are the roller crowns and 10 is the driving mechanism. The furnace may be provided, in known manner, with baffle rings 11 and turning devices 12. 13 are the burners or air nozzles for the furnace. Mounted inside the furnace is the pipe 15, the wall of which is approximately concentric with the interior wall of the furnace. The pipe is closed at its upper end 16 and open at the lower end 17. 18 are the gas intakes leading to the pipe 15 and 19 are supplementary gas outlets through which gases may escape from the pipe 15 into the furnace chamber. The foundation 20 and other fittings of the furnace can be of the usual type. If the furnace is to be used, for example, for roasting zinc blende, the roasting air is admitted into the furnace through the nozzles 13, and the exhaust roasting gases led away through the gas outlet 7. Consequently the charge material and the gases travel in counterflow. In the uppermost zone of the furnace, the roasting of the blende proceeds very actively, so that temperatures in that zone might become so high as to cause undesirable sintering of the not yet completely roasted blende. Towards the lower end of the furnace the temperature gradually diminishes, so that, in the final zone, in which the material contains but very little sulphur, the roasting proceeds very slowly.

According to the invention, the temperature conditions in the furnace are improved by admitting auxiliary roasting air through the intakes 18 and pipe 15. This roasting air is strongly heated in the forward portion of the furnace. In the second half of the pipe it parts with a portion of its heat directly through the wall of the pipe. It then passes, by way of the open end of the pipe and the supplementary openings 19, into the interior of the furnace, so that it comes, in a highly heated condition, into contact with the charge material, with the result that the roasting reaction is very considerably stimulated in the final portion of the furnace. In this manner, the dead-roasting of the blende is substantially improved and the efficiency of the furnace increased.

The method of supplying heat to the cold portions of the furnace is however uniform in this case since the heat can pass from the walls of the freely exposed tube in an unhindered manner and distribute itself in all directions. Moreover, the flow of gas in the other portions of the furnace is not affected in any way.

Figs. 4 to 7 illustrate a tubular system 21 which is disposed in an otherwise similar rotary drum furnace and at the points which are found by experience to have the highest temperature. Said tubular system consists for example, according to Figs. 4 and 5, of a series of pipes 22 lying parallel to the axis of the furnace, each of the ends of which terminates in annular pipes 23 and 24. Cooling air is supplied from a connecting line 25 via the supplying and distributor head 26 and through a pipe 27 which rotates with the furnace, into the annular conduit 23, whence it passes through the parallel pipes 22 of the cooling system into the upper annular conduit 24. The air is passed thence through the return line 28 to the distributor head 26 and flows into line 29. It is possible, by regulating the quantity of air by means of valve 30, to withdraw any desired quantity of heat from the furnace. The supply and withdrawal lines 27 and 28 are preferably duplicated in order to obtain uniform loading of the tubular system.

The tubular cooling system 21 can also be arranged in a plurality of hot zones in the rotary drum furnace. If, for any reason, it appears advantageous to use long tubes which may extend to the cold furnace zones, such large quantities of gas can be passed through the tubes that the temperatures of such gases are approximately just as high or lower than the temperatures in the cold zones of the rotary drum furnace in which the cooling device projects.

Fig. 6 shows another embodiment. In this case different tubular cooling systems 31 are arranged in different zones of the furnace. The cooling air supplied in approximately the same manner as described for the device of Fig. 4 from the supply line 27 from distributor head 26 (not shown) is introduced into the cooling system. The quantity of cooling air for each individual cooling system is adjusted by means of valves 32, so that varying quantities of heat can be withdrawn from the different cooling systems and the appurtenant furnace zones. The hot air passes through the collecting line 33 into an annular collecting channel consisting of two parts 34 and 35. The part 34 is attached to the shell of the furnace and rotates therewith, whilst part 35 is fixed and is provided with a flue 36 through which the hot gases are led into the atmosphere.

In the method of supplying gases according to Fig. 4, the hot gases can be passed from pipe 29 into a cooler or heat exchanger and are cooled therein and returned to the cooling system in the furnace through pipe 25. Obviously the construction of the cooling system illustrated in Figs. 4 to 7 can be simplified by utilizing in place of the plurality of tubes 22 or 31 a larger tube situated in the middle of the furnace. The construction of this is dependent on the magnitude of the quantity of heat to be withdrawn.

The same or similar apparatus as is illustrated in Figs. 3 to 7 can be utilized in order to introduce heat into the rotary drum furnace. The heat carriers are then brought to suitably high temperatures outside the rotary drum furnace and the tubular system 21 is disposed in the furnace zones to be heated up, so that the heat carrier can transfer heat to said colder furnace zones through the walls of the pipes of system 22.

We claim:—

1. A rotary furnace having a heat exchange device located in the gas chamber thereof, an inlet pipe communicating with one end of the heat exchange device and an outlet pipe communicating with the other end, the inlet pipe and the outlet pipe extending through the furnace casing, and means for conducting a fluid heat carried through the inlet pipe, the heat exchange device and the outlet pipe.

2. A rotary furnace having pipes distributed lengthwise of the furnace casing and opening through the casing into the gas chamber thereof, a heat exchange device located in said gas chamber, an inlet pipe communicating with the heat exchange device and extending through the furnace casing, and means for conducting a gaseous heat carrier through said inlet pipe and heat exchange device.

3. A rotary furnace having pipes distributed lengthwise of the furnace casing and opening through the casing into the gas chamber thereof, a heat exchange device located in said gas chamber, an inlet pipe communicating with one end of the heat exchange device and an outlet pipe communicating with the other end thereof, the inlet pipe and the outlet pipe extending through the furnace casing, and means for conducting a gaseous heat carrier through the inlet pipe, the heat exchange device and the outlet pipe.

4. A rotary furnace having a heat exchange device located in the gas chamber thereof, an inlet pipe communicating with the heat exchange device and extending through the furnace casing, and means for conducting a heat carrier through the inlet pipe and the heat exchange device, said means comprising pipes secured to the outside of the furnace casing and communicating with a supply of heat carrier.

5. A rotary furnace having a heat exchange device located in the gas chamber thereof, an inlet pipe communicating with one end of the heat exchange device and an outlet pipe communicating with the other end, the inlet pipe and the outlet pipe extending through the furnace casing, and means for conducting a heat carrier through the inlet pipe, the heat exchange device and the outlet pipe, said means comprising pipes secured to the outside of the furnace casing and communicating with a supply of heat carrier.

6. A rotary furnace having pipes distributed lengthwise of the furnace casing and opening through the casing into the gas chamber thereof, a heat exchange device located in the gas chamber of the furnace, an inlet pipe communicating with the heat exchange device and extending through the furnace casing, and means for conducting a gaseous heat carrier through the heat exchange device and the inlet pipe, said means comprising pipes secured to the outside of the furnace casing and communicating with a supply of heat carrier.

7. A rotary furnace having pipes distributed lengthwise of the furnace casing and opening through the casing into the gas chamber thereof, a heat exchange device located in the gas chamber of the furnace, an inlet pipe communicating with one end of the heat exchange device and an outlet pipe communicating with the other end, the inlet pipe and the outlet pipe extending through the furnace casing, and means for conducting a gaseous heat carrier through the inlet pipe, the heat exchange device and the outlet pipe, said means comprising pipes secured to the outside of the furnace casing and communicating with a supply of heat carrier.

8. A rotary furnace having a tube located in the gas chamber thereof, an inlet pipe communicating with one end of the tube and an outlet pipe communicating with the other end, the inlet pipe and the outlet pipe extending through the furnace casing, and means for conducting a heat carrier through the inlet pipe, the tube and the outlet pipe.

9. A rotary furnace having pipes distributed lengthwise of the furnace casing and opening through the casing into the gas chamber thereof, a tube located in the gas chamber of the furnace, an inlet pipe extending through the furnace casing and communicating with the tube, and means for conducting a gaseous heat carrier through the inlet pipe and the tube.

10. A rotary furnace having pipes distributed lengthwise of the furnace casing and opening through the casing into the gas chamber thereof, a tube located in the gas chamber of the furnace, an inlet pipe communicating with one end of the tube and an outlet pipe communicating with the other end, the inlet pipe and the outlet pipe extending through the furnace casing, and means for conducting a heat carrier through the inlet pipe, the tube and the outlet pipe.

11. A rotary furnace with pipes for a gaseous agent distributed lengthwise of the furnace casing and opening into the gas chamber thereof, a tube arranged in the gas chamber of the furnace and communicating therewith, an inlet pipe extending through the furnace casing to the tube, and means for conducting a gaseous heat carrier through the inlet pipe and the tube into the furnace chamber.

12. A rotary furnace having a group of tubes located in the gas chamber thereof, inlet pipes extending through the furnace casing, connections from the inlet pipes to one end of each of the tubes of said group of tubes, and means for conducting a gaseous heat carrier through said inlet pipes, connections and tubes.

13. A rotary furnace having a group of tubes located in the gas chamber thereof and communicating therewith, inlet pipes extending through the furnace casing, connections from the inlet pipes to one end of each of the tubes of said group of tubes, and means for conducting a gaseous heat carrier through said inlet pipes, connections and tubes into the furnace.

14. A rotary furnace having a group of tubes located in the gas chamber thereof, inlet pipes and outlet pipes extending through the furnace casing, connections from the inlet pipes to one end of each of the tubes of said bundle of tubes, and connections from the other end of each of said tubes to said outlet pipes, and means for conducting a heat carrier through said inlet pipes, tubes and outlet pipes.

15. Rotary furnace as defined in claim 14, in which a separate bundle of tubes is arranged in each of a plurality of zones of the furnace.

16. A process for controlling the temperature in any part of the gas chamber of a rotary furnace, which comprises passing a fluid in indirect heat transfer relation with the furnace gases in said part only of the gas chamber.

CARL PAUL DEBUCH.
ERNST MARKWORTH.

CERTIFICATE OF CORRECTION.

Patent No. 2,005,648.  June 18, 1935

CARL PAUL DEBUCH, ET AL.

It is hereby certified that error appears in the printed specification of th above numbered patent requiring correction as follows: Page 4, first column, line 7, claim 1, for "carried" read carrier; and that the said Letters Patent should be read with this correction therein that the same may conform to the record of the case in the Patent Office.

Signed and sealed this 13th day of August, A. D. 1935.

(Seal)

Leslie Frazer

Acting Commissioner of Patents.